US009433065B2

(12) United States Patent
Raynor

(10) Patent No.: US 9,433,065 B2
(45) Date of Patent: Aug. 30, 2016

(54) LIGHTING SYSTEM INCLUDING TIME OF FLIGHT RANGING SYSTEM

(71) Applicant: STMicroelectronics (Research & Development) Limited, Marlow, Buckinghamshire (GB)

(72) Inventor: Jeffrey M. Raynor, Edinburgh (GB)

(73) Assignee: STMicroelectronics (Research & Development) Limited, Marlow, Buckinghamshire (GB)

( * ) Notice: Subject to any disclaimer, the term of this patent is extended or adjusted under 35 U.S.C. 154(b) by 16 days.

(21) Appl. No.: 14/533,634

(22) Filed: Nov. 5, 2014

(65) Prior Publication Data

US 2016/0128162 A1 May 5, 2016

(51) Int. Cl.
*H05B 37/02* (2006.01)
*G01S 17/08* (2006.01)
*G01S 17/88* (2006.01)

(52) U.S. Cl.
CPC ........... *H05B 37/0227* (2013.01); *G01S 17/08* (2013.01); *G01S 17/88* (2013.01)

(58) Field of Classification Search
CPC .......... H05B 33/0869; H05B 33/0854; H05B 33/086; H05B 33/0872; H05B 37/0227; G01S 17/08; G01S 17/88
USPC ......................................... 315/149–152, 158
See application file for complete search history.

(56) References Cited

U.S. PATENT DOCUMENTS

| | | | | |
|---|---|---|---|---|
| 2004/0114921 A1* | 6/2004 | Braun | .................... | B60Q 9/008 396/661 |
| 2007/0228262 A1* | 10/2007 | Cantin | .................... | G01P 13/00 250/221 |
| 2009/0109353 A1* | 4/2009 | Liu | .................... | H05B 37/0227 349/1 |
| 2009/0195166 A1* | 8/2009 | Chen | .................. | H05B 33/0863 315/158 |
| 2010/0259174 A1* | 10/2010 | Hou | .................... | H05B 37/0227 315/149 |
| 2010/0295481 A1* | 11/2010 | Van Endert | ............ | H03K 17/96 315/312 |
| 2012/0194479 A1* | 8/2012 | Stark | .................... | G06F 3/0428 345/175 |
| 2012/0262069 A1* | 10/2012 | Reed | .................. | H05B 37/0245 315/130 |
| 2013/0194778 A1* | 8/2013 | Santos | ...................... | F21V 9/16 362/84 |
| 2013/0314711 A1* | 11/2013 | Cantin | .................... | G01S 17/10 356/445 |

* cited by examiner

*Primary Examiner* — Jason M Crawford
(74) *Attorney, Agent, or Firm* — Gardere Wynne Sewell LLP

(57) ABSTRACT

A lighting system includes a light emitting diode array, and a time of flight ranging system. A logic circuit determines a distance to an object using the time of flight ranging system and controls the light emitting diode array based upon the distance to the object. A receptacle is coupled to the logic circuit, and sized and configured to fit within and be powered from a light bulb socket. In some applications, the logic circuit may activate the light emitting diode array when the object is less than a threshold distance away from the lighting system and deactivate the light emitting diode array when the object is greater than the threshold distance away from the lighting system. In further applications, the logic circuit may activate the light emitting diode array at a duty cycle that varies based upon the distance to the object.

20 Claims, 9 Drawing Sheets

LIGHTING SYSTEM INCLUDING TIME OF FLIGHT RANGING SYSTEM

FIELD OF THE INVENTION

This invention is directed to the field of lighting systems that are controlled based upon their distance from an object, and, more particularly, to lighting systems that utilize time-of-flight ranging systems to determine their distance from the object.

BACKGROUND

Incandescent light bulbs have largely been replaced with compact fluorescent lights in today's world to reduce energy consumption. These compact fluorescent lights are typically designed and manufactured to be compatible with existing incandescent light bulb sockets and fixtures so as to ease transition from the incandescent light bulbs to the compact fluorescent lights.

Similarly, halogen light bulbs are now being replaced with light emitting diode (LED) arrays. These LED arrays offer a longer life span and offer greater energy efficiency. However, the consumer demand for even greater energy efficiency leads to a desire for the addition of further power saving features to these LED arrays. However, due to the fact that these LED arrays are designed and manufactured to be compatible with existing halogen light bulb sockets, space is at a premium, and typical power savings features, such as proximity sensor, may be difficult to implement.

Consequently, the development of LED arrays with power saving features and that will maintain compatibility with existing halogen light bulb sockets is desirable.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In accordance with this disclosure, one aspect is directed to a lighting system that includes a light emitting diode array, a time of flight ranging system, and a logic circuit. The logic circuit may be configured to determine a distance to an object using the time of flight ranging system and to control the light emitting diode array based upon the distance to the object. A receptacle is coupled to the logic circuit, and may be sized and configured to fit within and be powered by a light bulb socket.

The logic circuit may be configured to control the light emitting diode array based upon the distance to the object by activating the light emitting diode array when the object is less than a threshold distance away from the lighting system, and by deactivating the light emitting diode array when the object is greater than the threshold distance away from the lighting system.

The logic circuit may be configured to control the light emitting diode array based upon the distance to the object by activating the light emitting diode array at a duty cycle that varies based upon the distance to the object. The duty cycle may vary proportionally with the distance to the object, or may vary inversely proportionately with the distance to the object.

The logic circuit may be configured to control the light emitting diode array based upon the distance to the object by activating the light emitting diode array at a first duty cycle when the distance to the object is a first distance, and by activating the light emitting diode array at a second duty cycle when the distance to the object is a second distance.

The logic circuit may be configured to control the light emitting diode array based upon whether the receptacle is powered by the light bulb socket in a first mode, and may be configured to control the light emitting diode array based upon the distance to the object in a second mode. In addition, the logic circuit may be configured to switch control of the light emitting diode from the first mode to the second mode based upon the distance to the object being less than a threshold distance during a first interval of time. The logic circuit may be configured to switch control of the light emitting diode from the second mode to the first mode based upon the distance to the object being less than a threshold distance during a second interval of time different than the first interval of time.

The time of flight ranging system may include a vertical cavity surface emitting laser configured to emit ranging light, and a Geiger mode avalanche photodetector configured to detect reflected ranging light that has reflected off the object.

Another aspect is directed to a lighting system that includes a light emitting diode array, a ranging light source, a reflected light detector, and a logic circuit. The logic circuit may be configured to activate the ranging light source to cause the ranging light source to emit ranging light, and monitor output from the reflected light detector to detect reflected ranging light that has reflected off an object and back to the reflected light detector. The logic circuit may also be configured to determine a distance to the object based upon time elapsed between activating the ranging light source and detecting the reflected ranging light, and to control the light emitting diode array based upon the distance to the object.

The logic circuit may be configured to monitor output from the reflected light detector during a first interval of time, and to control the light emitting diode array such that the light emitting diode array is activated during a second interval of time different than the first interval of time and deactivated during a third interval of time overlapping the first interval of time.

A logic block may be coupled between the reflected light detector and the logic circuit, and may be configured to block signals from the reflected light detector from reaching the logic circuit when the light emitting diode array is activated.

The reflected light detector may include a photodetector capable of operating in Geiger mode, and the logic circuit may be configured to supply a voltage to the photodetector at a level sufficient to operate the photodetector in Geiger mode when the light emitting diode array is not activated, and to supply the voltage to the photodetector at a level insufficient to operate the photodetector in Geiger mode when the light emitting diode array is activated.

A first supply node may be configured to supply a first voltage to the light emitting diode array, and a second supply node may be configured to supply a second voltage less than the first voltage to the time of flight ranging system.

A method aspect is directed to a method of operating a lighting system. The method may include emitting ranging light from a ranging light source, and detecting reflected ranging light that has reflected off an object and back to a reflected light detector. A distance to the object may be determined based upon time elapsed between emitting the ranging light and detecting the reflected ranging light, using a logic circuit. A light emitting diode array may be controlled based upon the distance to the object, using the logic circuit.

DETAILED DESCRIPTION

One or more embodiments of the present disclosure will be described below. These described embodiments are only examples of the presently disclosed techniques. Additionally, in an effort to provide a concise description, some features of an actual implementation may not be described in the specification. When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements.

Figure 1A:
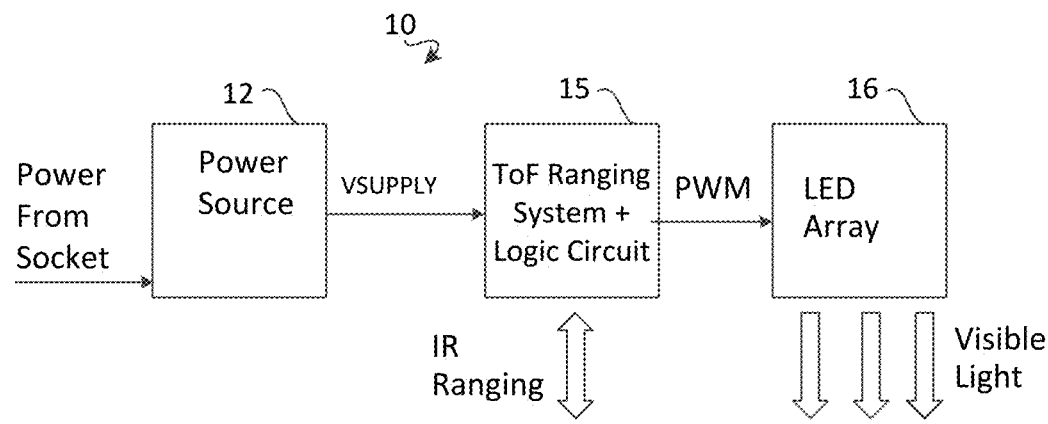
FIG. 1A is a schematic block diagram of a lighting system employing a time of flight ranging system in accordance with this disclosure.

With initial reference to FIG. 1A, a lighting system 10 is now described. The lighting system 10 includes a light emitting diode (LED) array 16 configured to emit visible light, and that is controlled by a time of flight ranging system and logic circuit 15. The LED array 16 is coupled between the logic circuit 15 and a reference voltage. A power source 12 provides a voltage supply Vsupply to the time of flight ranging system and logic circuit 15, and is itself powered by a light socket. For example, a receptacle may be coupled to the power source 12, and may be configured to fit within and accept power from the light socket.

Figure 4:
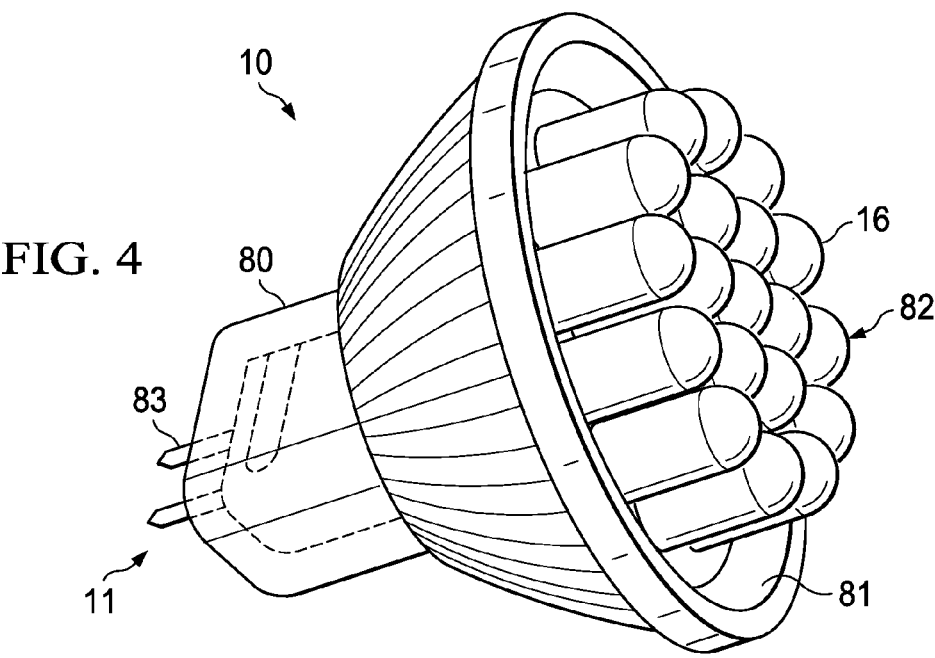
FIG. 4 is a perspective view of a lighting system employing a time of flight ranging system in accordance with this disclosure.
Figure 5:
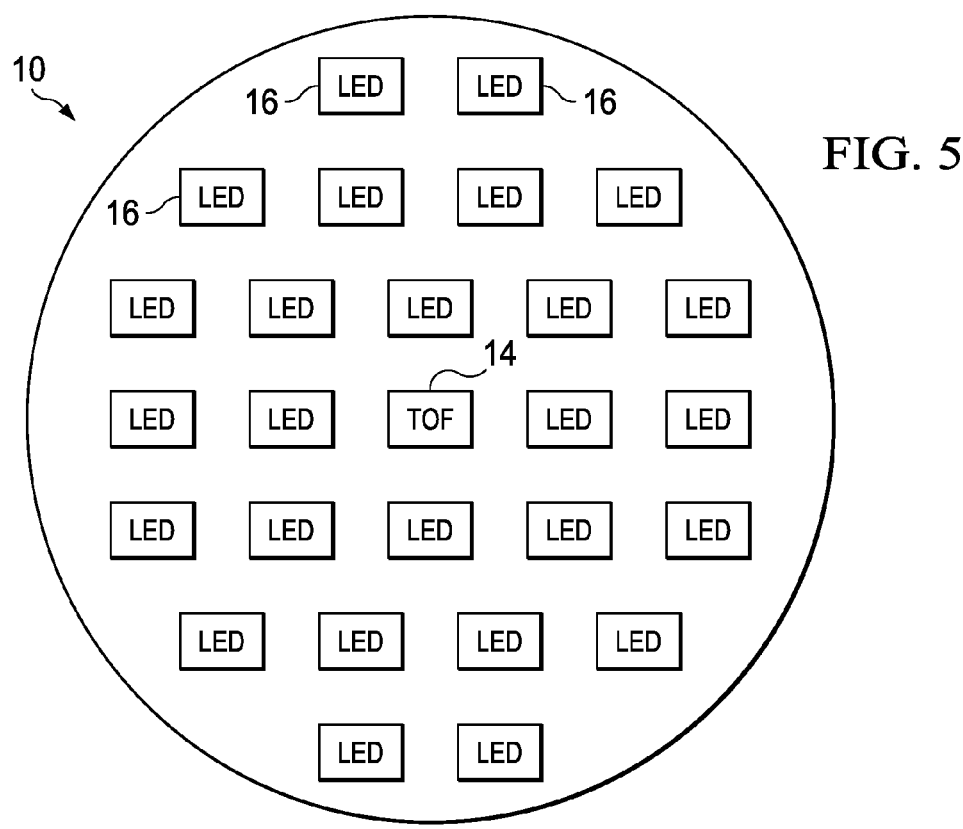
FIG. 5 is a front view of the lighting system of FIG. 4 showing the LED array and time of flight ranging system.

An example form factor for the lighting system 10 having the receptacle 11 is shown in FIG. 4. The receptacle 11 includes a housing 80, with a plug 83 extending therefrom. Although the plug 83 illustratively is shown as a pair of pins, in some applications it may instead be a singular threaded plug. The housing 80 carries the electronics described above, as well as a reflector 81, which LED array 16 is positioned inside. The reflector 81 helps to collect and focus the light emitted from the LED array 16. A lens 82 covers the LED array 16 for protection and further light collection and focusing. The time of flight ranging module 14 may be located centrally within the LED array 16, as shown in FIG. 5.

Figure 1B:
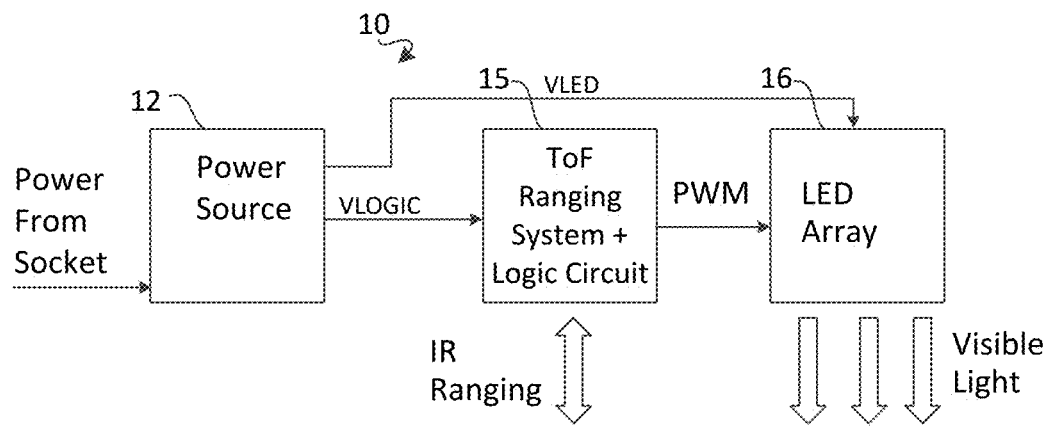
FIG. 1B is a schematic block diagram of a lighting system similar to that of FIG. 1A, but supplied differently.

In operation, the logic circuit 15 uses the time of flight ranging system to determine the distance to an object, and controls the LED array 16 based upon that distance, for example by activating the LED array 16 at a desired duty cycle, or deactivating the LED array 16. In some applications, the LED array 16 may operate at a higher voltage than the time of flight ranging system and logic circuit 15. In such an application, as shown in FIG. 1B, the power source 12 may provide a higher voltage Vled to the LED array 16 than the voltage Vlogic supplied to the time of flight ranging system and logic circuit 15.

Figure 2:
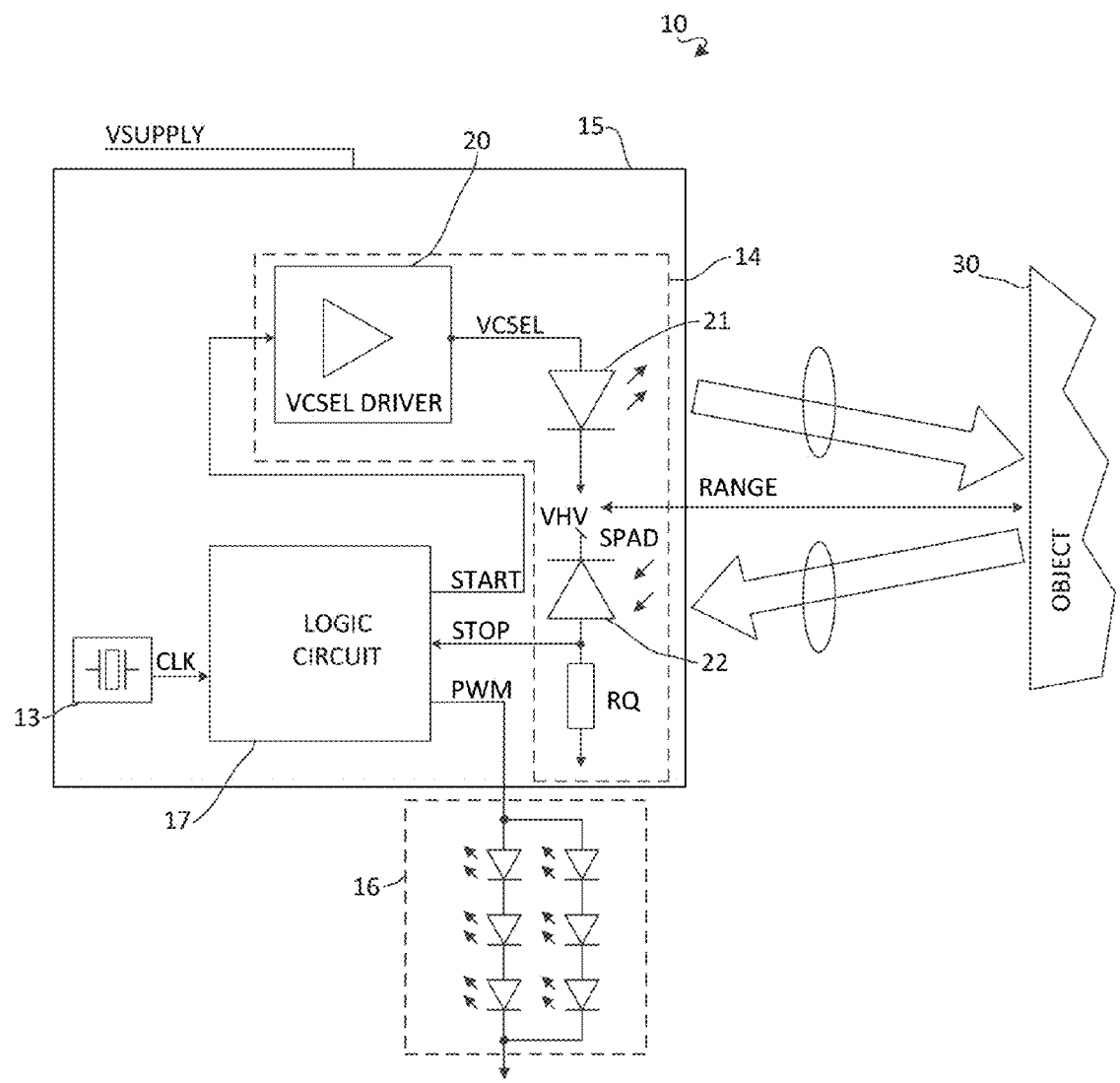
FIG. 2 is a detailed schematic block diagram of a lighting system employing a time of flight ranging system in accordance with this disclosure.

With reference to FIG. 2, greater details of an embodiment of the system 10 are now provided. Here, the logic circuit 17 and time of flight ranging system 14 are collocated on an integrated circuit 15. The time of flight ranging system 14 includes a ranging light source 21, illustratively a vertical cavity surface emitting laser (VCSEL). The ranging light source 21 is driven by a VCSEL driver 20, which is actuated by the logic circuit 17. When activated, the ranging light source 21 emits pulses of laser light, which travel to and are reflected off an object 30.

The time of flight ranging system 14 also includes a reflected light detector 22, illustratively a single photon avalanche diode or Geiger-mode avalanche photon diode, which detects the ranging light that has been reflected from the object 30. The logic circuit 17 monitors the output of the reflected light detector 22, and determines the distance to the object based upon the time elapsed between activating the ranging light source 21 and detecting the reflected ranging light.

Figure 3:
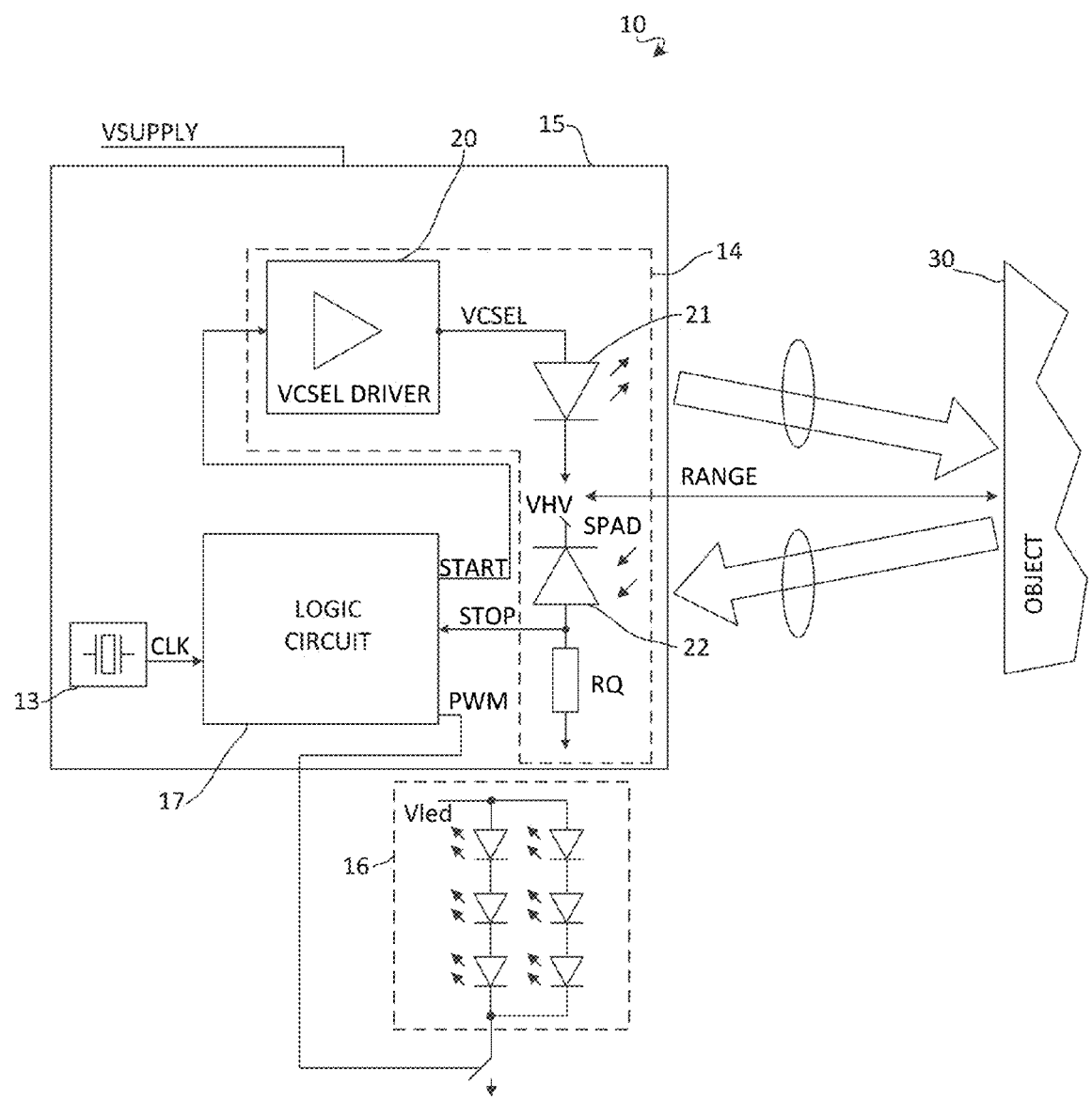
FIG. 3 is a detailed schematic block diagram of a lighting system similar to that of FIG. 2, but with its LED array biased differently.

The logic circuit 17 generates a pulse width modulation (PWM) signal to drive the LED array 16. The PWM signal is based upon the distance to the object, and the logic circuit 17 may generate the PWM signal differently depending upon which mode it is currently in. As an alternative design choice, in some applications, as shown in FIG. 3, the LED array 16 may be coupled between a LED driving voltage Vled and a reference voltage, with the logic circuit 15 opening or closing a switch between the LED array 16 and the reference voltage via the PWM signal.

For example, the logic circuit 17 may operate in a "smart" mode in which it generates a constant PWM signal when the object is less than a threshold distance away from the lighting system 10, and may generate no PWM signal when the object is more than the threshold distance away from the lighting system. Thus, in the "smart" mode, the logic circuit 17 can be said to activate the LED array 16 when the object is less than the threshold distance away, and to deactivate the LED array 16 when the object is more than the threshold distance away.

The logic circuit 17 may switch from operating in a "normal" mode in which it generates a constant PWM signal regardless of the distance between the object and the lighting system 10 and the "smart" mode based upon receiving input from a switch (not shown). Alternatively, the logic circuit 17 may switch from operating in the "normal" mode to the "smart" mode based upon the distance between the lighting system 10 and the object being between upper and lower thresholds during a first interval of time, and may switch back from operating in the "smart" mode to the "normal" mode based upon the distance between the lighting system 10 and the object being between the upper and lower thresholds during a second interval of time different than the first interval of time.

As another example, the logic circuit 17 may operate in a "smart dimming" mode, in which it varies the duty cycle of PWM signal based upon the distance to the object, for example by varying the duty cycle proportionately or inversely proportionately with respect to the distance. This serves to dim the light as perceived by a viewer due to the way the human eye perceives pulses of light. Therefore, in the "smart dimming" mode, the logic circuit 17 can be said to brighten or dim the LED array based upon the distance to the object.

This varying can be done at any rate, for example, by $$\frac{1}{d^2},$$

with d being the distance, so as to maintain a constant apparent illumination from the perspective of the object (which is likely a person). As another example, upper and lower distance thresholds can be set, and the varying can be done such that the PWM duty cycle is based upon (Distance−Lower Threshold)*(Upper Threshold−Lower Threshold).

In some applications, the logic circuit 17 may operate the "smart dimming" mode such that it varies the duty cycle of the PWM signal in discrete steps based upon the distance, such as 0% when no object is detected or when the object is not within a first distance, 33% when the object is within a first distance but less than a second distance, 66% when the object is within the second distance but less than a third distance, and 100% when the object is within the third distance. In addition, the logic circuit 17 may operate the "smart dimming" mode such that it varies the duty cycle of the PWM signal between lower and upper nonzero values, such as 50% when no object is detected or when the object is not within a threshold distance, and 100% when the object is within the threshold distance.

Figure 6:
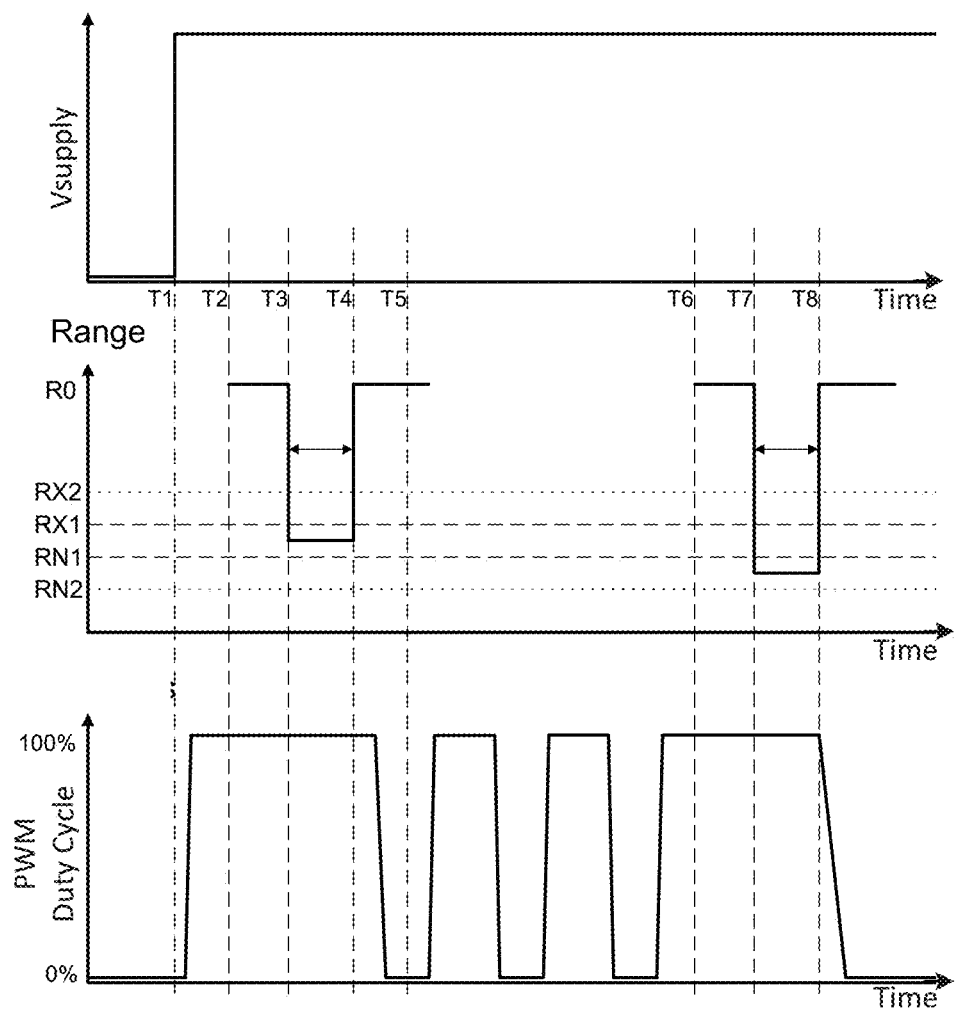
FIG. 6 is a timing diagram of a lighting system employing a time of flight ranging system being switched between a standard mode and a "smart" mode.

The initial power-up of the lighting system 10 and switching of modes from "normal" to "smart" or "smart dimming" is now fully described with reference to the timing diagram shown in FIG. 6. A brief period of time after power is applied to the receptacle, the supply voltage Vsupply goes high at T1. At T2, which is shortly after T1 (typically less than 1 second), the time of flight ranging module 14 begins operation, and the logic circuit 17 uses the time of flight ranging module 14 to measure the distance between the lighting system 10 and a static background object, such as a counter top, which is at range R0. The PWM duty cycle is high to indicate to the user that the logic circuit 17 is awaiting instruction by activating the LED array 16. At T3, which is shortly after T2, an object (such as a user's hand) is placed between the background and the lighting system 10 between the upper threshold range RX1 and the lower threshold range RN1 for an interval of time between T3 and T4, and is then removed. Once the object is removed and the range observed returns to R0, the logic circuit 17 enters the "smart" or "smart dimming" mode, and varies the PWM duty cycle based upon the measured distances between the lighting system 10 and the object. To alert the user that the "smart" or "smart dimming" mode has been entered, the logic circuit 17 flashes the LED array 16 on and off two times, as shown by the PWM duty cycle between T5 and T6.

At a later time, T7, the object is placed between a lower threshold RN2 and an upper threshold RN1 for a time interval between T7 and T8, and is then removed. Once the object is removed and the range observed returns again to R0, the logic circuit 17 switches back to the "normal" mode.

The values of RN1 and RX1 may be programmed into the logic circuit 17, or could be set by the logic circuit 17 based upon the range R0 (distance to the static background object). Still further, the values of RN1 and RX1 may be set by the logic circuit 17 based upon the distance to the object at two separate times. Similarly, the values of RN2 and RX2 may be programmed into the logic circuit 17, could be set by the logic circuit based upon the range R0, or could be set by the logic circuit 17 based upon the distance to the object at two separate times.

Figure 7:
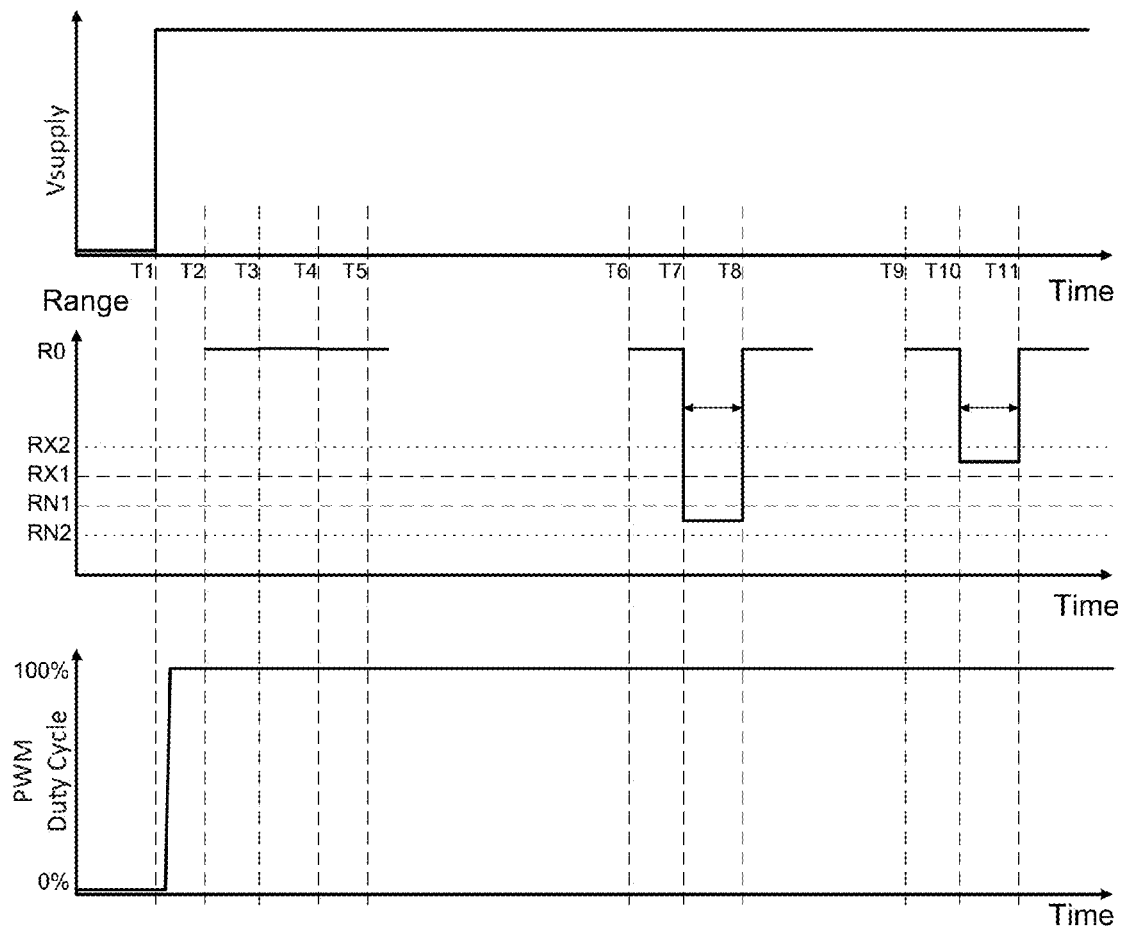
FIG. 7 is a timing diagram of a lighting system employing a time of flight ranging system being operated in a standard mode.

Shown in FIG. 7 is a timing diagram of operation of the lighting system 10 where, between T3 and T4, an object is not detected between the static background and the lighting system, is now descried. Here, "smart" or "smart dimming" mode is never entered by the lighting system 10 between T3 and T4, so the PWM duty cycle stays high, despite the fact that an object is detected between the static background and the lighting system at T7-T8 and T10-T11.

Figure 8:
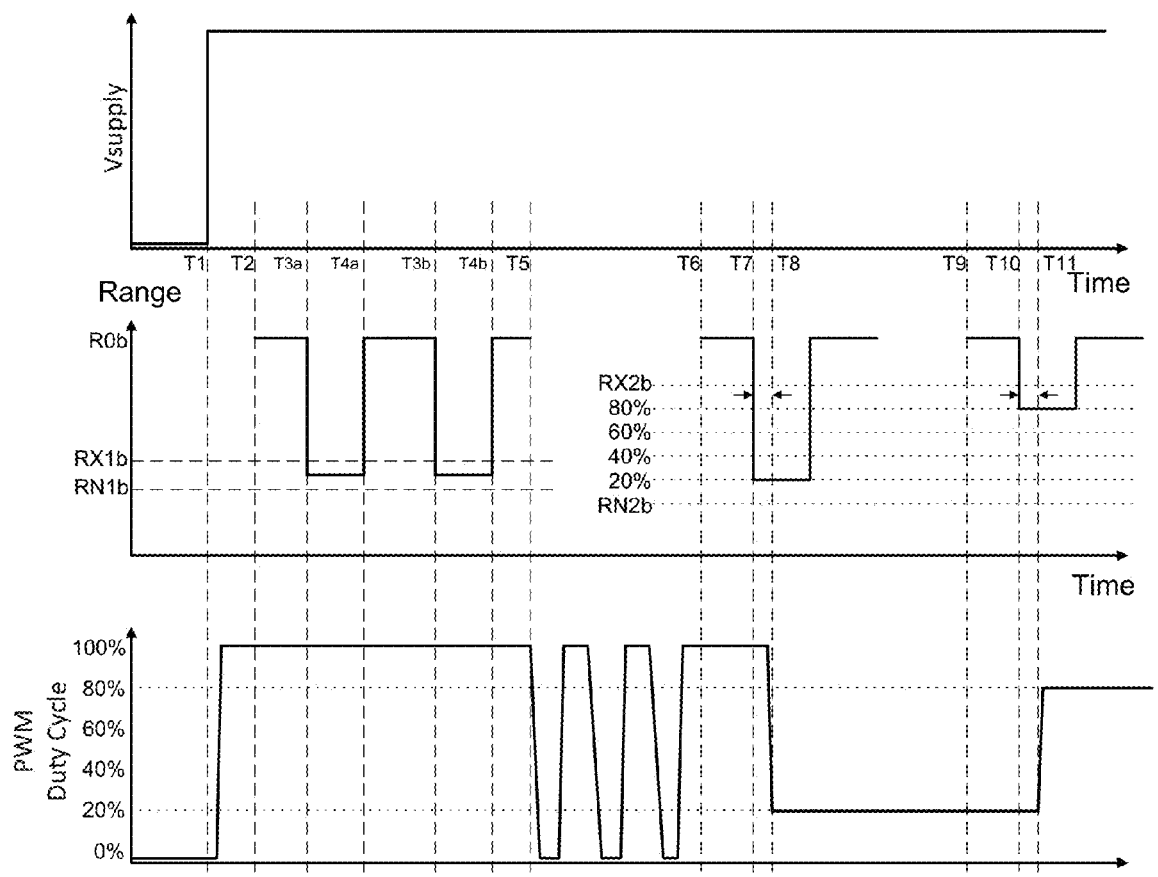
FIG. 8 is a timing diagram of a lighting system employing a time of flight ranging system being switched between a standard mode and a "smart dimming" mode.

An alternative method of switching modes of the logic circuit 17 from "normal" to "smart" or "smart dimming" is now fully described with reference to the timing diagram shown in FIG. 8. A brief period of time after power is applied to the receptacle, the supply voltage Vsupply goes high at T1. At T2, which is shortly after T1 (typically less than 1 second), the time of flight ranging module 14 begins operation, and the logic circuit 17 uses the time of flight ranging module 14 to measure the distance between the lighting system 10 and the static background object, which is at range R0. The PWM duty cycle is high to indicate that the logic circuit 17 is awaiting instruction. Between T2 and T3A, the object is brought between the lower range threshold RN1B and the upper range threshold RX1B, and then removed. Between T3A and T4B, the object is once again brought between RN1B and RX1B, and then removed. The logic circuit 17, based upon the object being brought between the upper and lower range thresholds for the intervals of time between T3A and T4A, and between T3B and T4B, then switches into the "smart" or "smart dimming" mode at time T5, and causes the PWM duty cycle to go high twice, this activating the LED array 16 twice to indicate to the user that the "smart" or "smart dimming" mode has been entered.

The values of RX1B and RN1B may be programmed into the logic circuit 17, or could be set by the logic circuit 17 based upon the range R0 (distance to the static background object). Still further, the values of RX1B and RN1B may be set by the logic circuit 17 based upon the distance to the object at two separate times.

In some applications where the logic circuit 17 is programmed with the logic for either the "smart" mode or the "smart dimming" mode, either of the two above methods for entering the mode may be used. In the case where the logic circuit 17 is programmed with the logic for both the "smart" mode and the "smart dimming" mode, one of the above methods may be used for entering the "smart" mode, while one may be used for entering the "smart dimming" mode.

Figure 9:
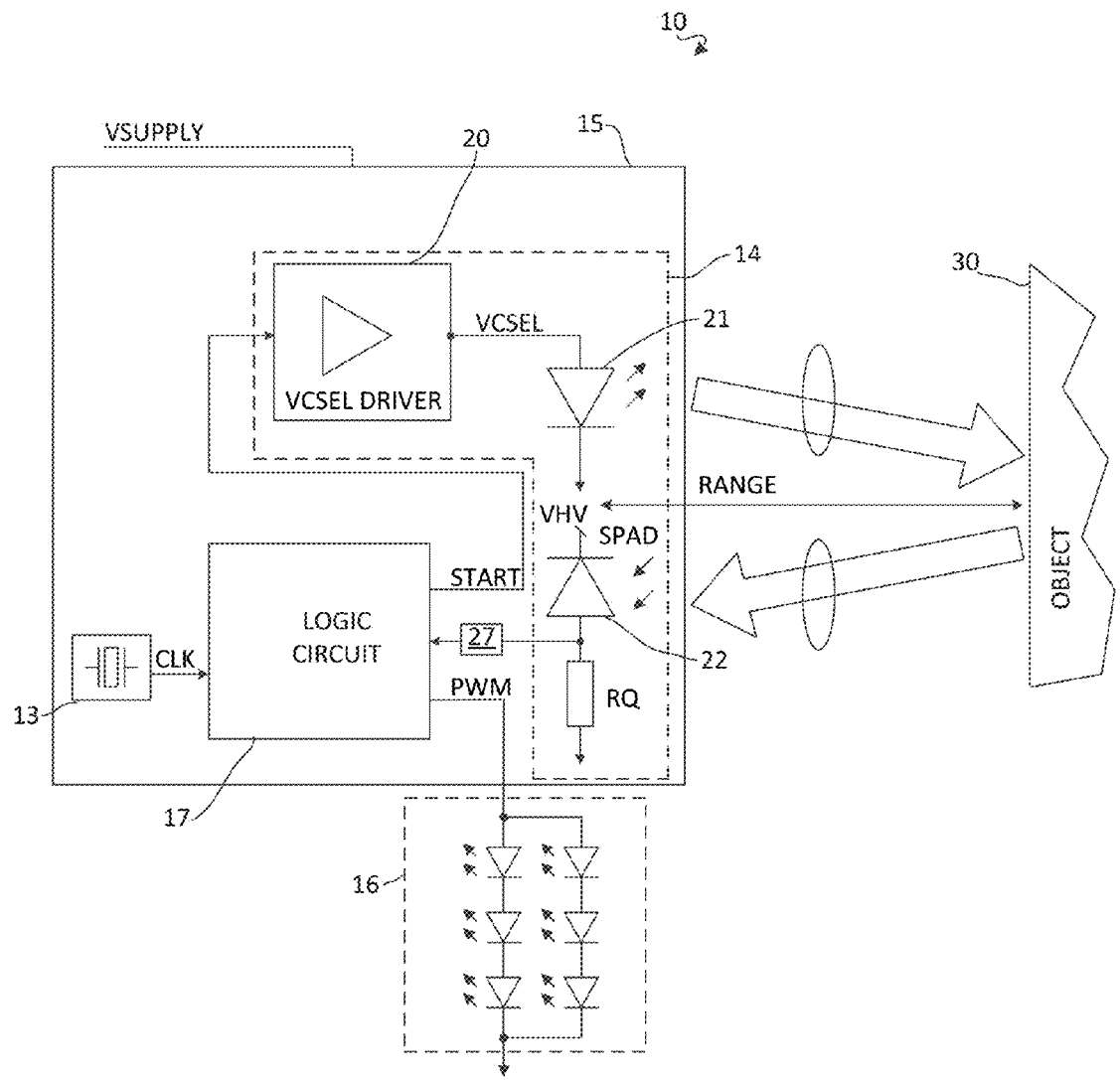
FIG. 9 is a detailed schematic block diagram of a lighting system similar to that of FIG. 2 but with a logic block between the time of flight ranging system and the logic circuit to help reduce detection of ambient light by the time of flight ranging system.

Referring again to FIG. 2, the reflected light detector 22 is sensitive to ambient light as well as light from the ranging light source 21. As the detection field of the ranging light detector 22 is likely to be aligned to the light cone from the LED array 116, a large amount of ambient light could potentially be detected by the reflected light detector 22 and degrade accuracy of the range detection. Therefore, as shown in FIG. 9, a logic block 27 may be inserted between the reflected light detector 22 and the logic circuit 17 and may serve to block signals from the reflected light detector from reaching the logic circuit 17 when the duty cycle of the PWM is high.

As an alternative, the logic circuit 17 may be configured to monitor output from the reflected light detector 22 during an interval of time during which the duty cycle of the PWM is low, and to cause the duty cycle of the PWM to be high during a different interval of time. Thus, the logic circuit 17 may be said to monitor output from the reflected light detector 22 during a first interval of time, and control the LED array 16 such that the LED array 16 is activated during a second interval of time different than the first interval of time and deactivated during a third interval of time overlapping the first interval of time.

Figure 10:
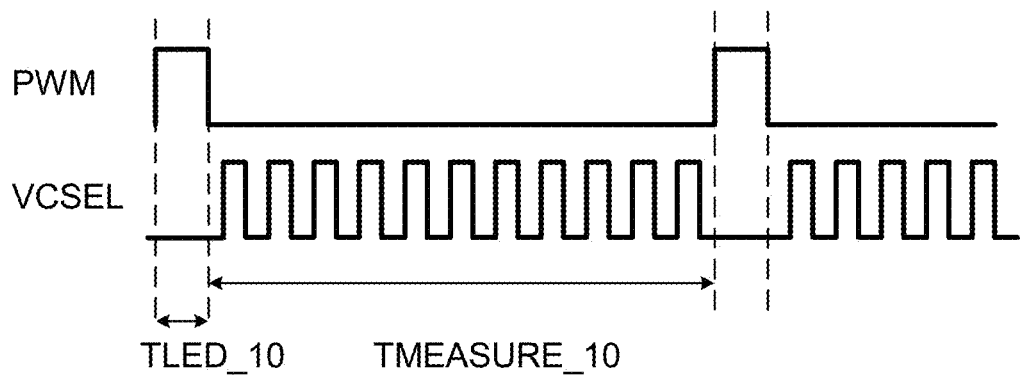
FIG. 10 is a timing diagram of a lighting system employing a time of flight ranging system being operated so as to help reduce detection of ambient light by the time of flight ranging system when the LED array is being operated at a lower duty cycle.
Figure 11:
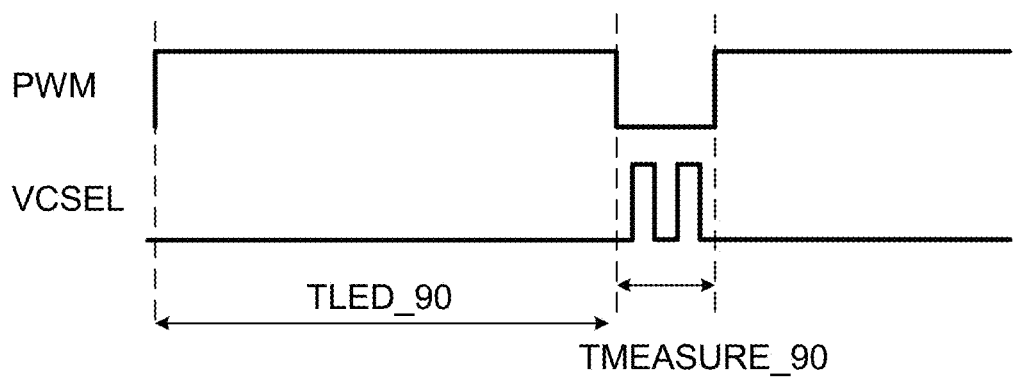
FIG. 11 is a timing diagram of a lighting system employing a time of flight ranging system being operated so as to help reduce detection of ambient light by the time of flight ranging system when the LED array is being operated at a higher duty cycle.

Example timing diagrams showing this are in FIGS. 10-11, where PWM is high when Vcsel, which activates the ranging light source 21, is low, as the ranging light source 21 is used during the intervals in which the reflected light detector 22 is to detect the reflected light.

As another alternative, the logic circuit 17 may be configured to supply a voltage to the reflected light detector 22 at a level sufficient to operate it in Geiger mode when the LED array is not activated, and to supply the voltage to it at a level insufficient to operate it in Geiger mode when the LED array is activated.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A lighting system comprising:
   a light emitting diode array;
   a time of flight ranging system, wherein the time of flight ranging system comprises a vertical cavity surface emitting laser configured to emit ranging light and a Geiger mode avalanche photodetector configured to detect reflected ranging light that has reflected off an object;
   a logic circuit configured to determine a distance to the object using the time of flight ranging system and to control the light emitting diode array based upon the distance to the object; and
   a receptacle coupled to the logic circuit, and sized and configured to fit within and be powered by a light bulb socket.

2. The lighting system of claim 1, wherein the receptacle comprises a housing carrying the logic circuit, with a set of terminals extending therefrom.

3. The lighting system of claim 1, wherein the logic circuit is configured to control the light emitting diode array based upon the distance to the object by activating the light emitting diode array when the object is less than a threshold distance away from the lighting system and deactivating the light emitting diode array when the object is greater than the threshold distance away from the lighting system.

4. The lighting system of claim 1, wherein the logic circuit is configured to control the light emitting diode array based upon the distance to the object by activating the light emitting diode array at a duty cycle that varies based upon the distance to the object.

5. The lighting system of claim 4, wherein the duty cycle varies proportionally with the distance to the object.

6. The lighting system of claim 4, wherein the duty cycle varies inversely proportionately with the distance to the object.

7. The lighting system of claim 1, wherein the logic circuit is configured to control the light emitting diode array based upon the distance to the object by activating the light emitting diode array at a first duty cycle when the distance to the object is a first distance, and by activating the light emitting diode array at a second duty cycle when the distance to the object is a second distance.

8. The lighting system of claim 1, wherein the logic circuit is configured to control the light emitting diode array based upon whether the receptacle is powered by the light bulb socket in a first mode, and is configured to control the light emitting diode array based upon the distance to the object in a second mode; and wherein the logic circuit is configured to switch control of the light emitting diode from the first mode to the second mode based upon the distance to the object being less than a threshold distance during a first interval of time.

9. The lighting system of claim 8, wherein the logic circuit is configured to switch control of the light emitting diode from the second mode to the first mode based upon the distance to the object being less than a threshold distance during a second interval of time different than the first interval of time.

10. A lighting system comprising:
    a light emitting diode array;
    a ranging light source;
    a reflected light detector comprising a photodetector capable of operating in Geiger mode;
    a logic circuit configured to
      selectively activate the ranging light source to cause the ranging light source to emit ranging light,
      supply a voltage to the photodetector at a level sufficient to operate the photodetector in Geiger mode when the light emitting diode array is not activated, and to supply the voltage to the photodetector at a level insufficient to operate the photodetector in Geiger mode when the light emitting diode array is activated;
      monitor output from the reflected light detector to detect reflected ranging light that has reflected off an object and back to the reflected light detector,
      determine a distance to the object based upon time elapsed between activating the ranging light source and detecting the reflected ranging light,
      control the light emitting diode array based upon the distance to the object.

11. The lighting system of claim 10, further comprising a receptacle coupled to the logic circuit, and sized and configured to fit within and be powered by a light bulb socket.

12. The lighting system of claim 10, wherein the logic circuit is configured to monitor output from the reflected light detector during a first interval of time, and to control the light emitting diode array such that the light emitting diode array is activated during a second interval of time different than the first interval of time and deactivated during a third interval of time overlapping the first interval of time.

13. A lighting system, comprising
a light emitting diode array;
a ranging light source;
a reflected light detector;
a logic circuit configured to
    activate the ranging light source to cause the ranging light source to emit ranging light,
    monitor output from the reflected light detector to detect reflected ranging light that has reflected off an object and back to the reflected light detector,
    determine a distance to the object based upon time elapsed between activating the ranging light source and detecting the reflected ranging light, and
    control the light emitting diode array based upon the distance to the object; and
a logic block coupled between the reflected light detector and the logic circuit, the logic block configured to block signals from the reflected light detector from reaching the logic circuit when the light emitting diode array is activated.

14. A lighting system, comprising
a light emitting diode array;
a ranging light source;
a reflected light detector;
a logic circuit configured to
    activate the ranging light source to cause the ranging light source to emit ranging light,
    monitor output from the reflected light detector to detect reflected ranging light that has reflected off an object and back to the reflected light detector,
    determine a distance to the object based upon time elapsed between activating the ranging light source and detecting the reflected ranging light, and
    control the light emitting diode array based upon the distance to the object; and
a first supply node configured to supply a first voltage to the light emitting diode array, and a second supply node configured to supply a second voltage less than the first voltage to the time of flight ranging system.

15. A method of operating a lighting system comprising:
emitting ranging light from a ranging light source comprising a vertical cavity surface emitting laser;
detecting reflected ranging light that has reflected off an object and back to a reflected light detector comprising a Geiger mode avalanche photodetector;
determining a distance to the object based upon time elapsed between emitting the ranging light and detecting the reflected ranging light, using a logic circuit; and
controlling a light emitting diode array based upon the distance to the object, using the logic circuit.

16. The method of claim 15, the light emitting diode array is controlled based upon the distance to the object by activating the light emitting diode array when the object is less than a threshold distance away from the lighting system and deactivating the light emitting diode array when the object is greater than the threshold distance away from the lighting system.

17. The method of claim 15, wherein the light emitting diode array is controlled based upon the distance to the object by activating the light emitting diode array at a duty cycle that varies based upon the distance to the object.

18. The method of claim 17, wherein the duty cycle varies proportionally with the distance to the object.

19. The method of claim 17, wherein the duty cycle varies inversely proportionately with the distance to the object.

20. The method of claim 15, wherein the light emitting diode array is controlled based upon the distance to the object by activating the light emitting diode array at a first duty cycle when the distance to the object is a first distance, and by activating the light emitting diode array at a second duty cycle when the distance to the object is a second distance.

* * * * *